(No Model.)
H. SCHWARZWALDER.
DOG FOR BARREL STAVES.
No. 289,453. Patented Dec. 4, 1883.
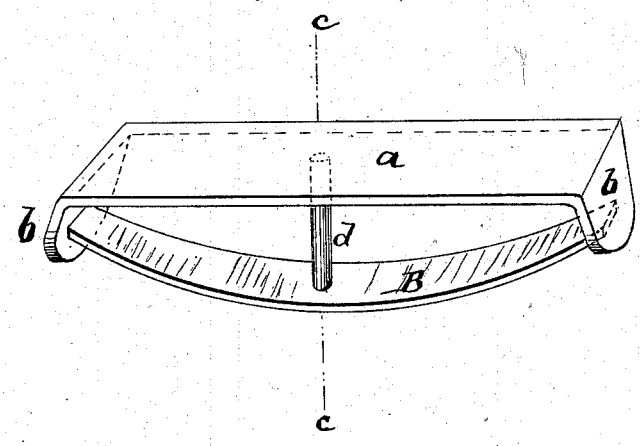
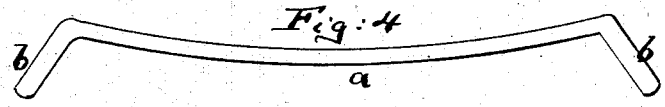
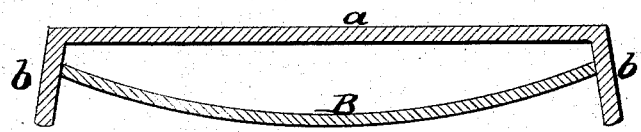
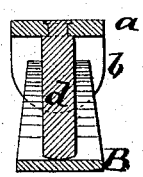
Witnesses
John C. Tunbridge
John M. Speir
Inventor:
Henry Schwarzwalder
by his attorneys
Briesen & Steele

UNITED STATES PATENT OFFICE.

HENRY SCHWARZWALDER, OF NEW YORK, N. Y., ASSIGNOR TO HIMSELF, ELIZABETH SCHWARZWALDER, AND ERNST H. HERB, ALL OF SAME PLACE.

DOG FOR BARREL-STAVES.

SPECIFICATION forming part of Letters Patent No. 289,453, dated December 4, 1883.

Application filed September 20, 1883. (No model.)

*To all whom it may concern:*

Be it known that I, HENRY SCHWARZWALDER, a resident of the city of New York, in the county and State of New York, have invented an Improved Dog for Barrel-Staves, of which the following is a full, clear, and exact description, reference being made to the accompanying drawings, in which—

Figure 1 is a perspective view of my improved dog for barrel-staves, showing it on a stave. Fig. 2 is a cross-section of the same on the line *c c*, Fig. 1. Fig. 3 is a longitudinal section of an ordinary dog for barrel-staves, and Fig. 4 is a side view of the same after short use.

This invention relates to an instrument for holding barrel-staves in the curved position into which they are brought by a bending-machine, so as to prevent them from resuming their original straight form. To this end dogs or holders have been used before my invention of the kind shown in Fig. 3—that is to say, the dog was a bar, *a*, of iron, with its ends *b b* turned up, as shown. When the stave B had been bent in the bending-machine to the proper extent, as in Fig. 3, and while still held in the bending-machine, the dog *a b* was dropped over it and the stave then detached from the bending-machine, the intention being to hold the stave in the curved position while hot until it should cool and set in the dog. But the difficulty with this arrangement was that the powerful stave, in its endeavor to become straight, would finally bend the dog into the shape shown in Fig. 4 and fly out of it, thus defeating the object of the entire device.

My invention simply consists in attaching to such a dog of the ordinary construction a central projection, which reaches to or nearly to the center of the stave on the concave side thereof, and thereby prevents it from straightening out and from bearing too heavily against the ends of the dog.

In Figs. 1 and 2, which show my improved dog, the body of the dog is shown at *a*, the turned-up ends at *b b*, the stave at B. In or near the center of the body *a* is attached to the same, by riveting or otherwise, a pin or projection, *d*, which, when the stave is in place, as in the said figures, will reach nearly to its center. It is quite clear that the stave, in endeavoring to straighten out, will be obstructed by this projection *d*, and will therefore not be able to fly out of the dog, nor will it have power enough to bend the ends *b b* aside. Instead of the single projection *d* in the center, there may be several projections at a suitable distance from the center; but for ordinary purposes the single central projection is best.

I claim—

The dog for barrel-staves, constructed of the body *a*, having on its face the turned-up rigid ends *b b* and between said ends the inner projection, *d*, substantially as described.

HENRY SCHWARZWALDER.

Witnesses:
A. V. BRIESEN,
CHARLES G. M. THOMAS.